US012127653B2

(12) United States Patent
Krulik et al.

(10) Patent No.: US 12,127,653 B2
(45) Date of Patent: Oct. 29, 2024

(54) STABILIZED LUGGAGE

(71) Applicant: Briggs and Riley Travelware, LLC, Hauppauge, NY (US)

(72) Inventors: Richard Krulik, Northport, NY (US); Georgene Rada, Northport, NY (US); Alan Sticca, White Plains, NY (US); Daehwan Kim, Bayside, NY (US); Michael O'Brien, Brooklyn, NY (US); Florian Witt, Wentorf (DE); Matthias Hecker, Hamburg (DE); Patric Moammer, New York, NY (US); Adrian Berr, Brooklyn, NY (US)

(73) Assignee: Briggs and Riley Travelware, LLC, Hauppauge, NY (US)

( * ) Notice: Subject to any disclaimer, the term of this patent is extended or adjusted under 35 U.S.C. 154(b) by 197 days.

(21) Appl. No.: 17/358,639

(22) Filed: Jun. 25, 2021

(65) Prior Publication Data
US 2021/0401137 A1    Dec. 30, 2021

Related U.S. Application Data

(60) Provisional application No. 63/044,806, filed on Jun. 26, 2020.

(51) Int. Cl.
*A45C 5/14*    (2006.01)
*B60B 33/00*    (2006.01)

(52) U.S. Cl.
CPC .......... *A45C 5/14* (2013.01); *A45C 2005/148* (2013.01); *B60B 33/0042* (2013.01); *B60B 33/0068* (2013.01); *B60B 33/0076* (2013.01)

(58) Field of Classification Search
CPC ................ A45C 5/14; A45C 2005/148; B60B 33/0076; B60B 2200/45
(Continued)

(56) References Cited

U.S. PATENT DOCUMENTS

| | | | | |
|---|---|---|---|---|
| 408,595 | A | * | 8/1889 | Dion ..................... B60B 33/045 16/44 |
| 3,768,116 | A | * | 10/1973 | Propst ................. B60B 33/0002 16/43 |
| 4,334,601 | A | * | 6/1982 | Davis ....................... A45C 3/00 190/111 |

(Continued)

FOREIGN PATENT DOCUMENTS

DE    102018101653 A1 *    7/2019    ......... B60B 33/0005

OTHER PUBLICATIONS

Creative Industrial Sales: https://www.amazon.com/Kingpinless-Forged-Swivel-Casters-Ductile/dp/B013PSI44C (Year: 2015).*

*Primary Examiner* — Don M Anderson
*Assistant Examiner* — Justin Caudill
(74) *Attorney, Agent, or Firm* — Scully, Scott, Murphy & Presser, P.C.

(57) ABSTRACT

A stabilized luggage article is disclosed. In one practice, the luggage article comprises a plurality of swiveling wheel assemblies, each assembly comprising one or more wheels having a horizontal axis of rotation and mounted to a pivot member, such as a pivot post that has a vertical axis of wheel rotation; the vertical axis of rotation is laterally spaced from the horizontal axis of rotation and is projected outwardly toward the front wall of the luggage but not beyond it, the pivot post extending downwardly at least to the level of the horizontal axis of wheel rotation, preferably beyond it for further increased stability.

25 Claims, 7 Drawing Sheets

(58) Field of Classification Search
USPC .................................................. 16/38
See application file for complete search history.

(56) References Cited

U.S. PATENT DOCUMENTS

| | | | | |
|---|---|---|---|---|
| 4,720,894 | A * | 1/1988 | Deasy | B60B 33/0002 16/386 |
| 5,782,325 | A * | 7/1998 | O'Shea | A45C 5/14 16/113.1 |
| 5,934,639 | A * | 8/1999 | Chiang | A47B 91/00 248/346.11 |
| 6,167,994 | B1 * | 1/2001 | Kuo | A45C 5/14 301/125 |
| 6,932,314 | B2 * | 8/2005 | Patterson | B60B 33/0039 248/346.11 |
| 7,086,510 | B2 * | 8/2006 | Smith | A45C 7/0022 220/8 |
| 7,128,494 | B2 * | 10/2006 | Lucht | B60B 33/001 248/188.7 |
| 8,850,658 | B2 * | 10/2014 | Dayt | B60B 33/0042 16/31 R |
| 8,904,598 | B2 * | 12/2014 | Waitz | B60B 33/0026 16/35 R |
| 9,101,186 | B2 * | 8/2015 | Lai | A45C 7/0027 |
| 10,377,175 | B2 * | 8/2019 | Franzone, Jr. | B60B 33/0002 |
| 2004/0163208 | A1 * | 8/2004 | Kuo | B60B 33/0049 16/29 |
| 2011/0168507 | A1 * | 7/2011 | Penley | A45C 7/0045 190/18 A |
| 2015/0130148 | A1 * | 5/2015 | Meersschaert | A45C 5/03 280/47.34 |
| 2015/0150347 | A1 * | 6/2015 | Scicluna | B60B 33/0023 190/18 A |
| 2016/0286914 | A1 * | 10/2016 | Hillaert | B60B 33/0002 |
| 2016/0366995 | A1 * | 12/2016 | Yeh | A45C 5/02 |
| 2019/0077193 | A1 * | 3/2019 | Chang | B60B 33/045 |

* cited by examiner

STABILIZED LUGGAGE

CROSS REFERENCE TO RELATED APPLICATION

This application claims priority to U.S. Provisional Application Ser. No. 63/044,806 filed on Jun. 26, 2020 the entire content of which is incorporated herein by reference for any purpose.

FIELD

The disclosure relates to a stabilized luggage article, for example, a luggage article that has a reduced propensity to tip over, and to a stabilizing swivel wheel assembly for an article of luggage.

BACKGROUND

Wheeled luggage, including upright swivel-wheeled luggage, has tendency to tip over when top loaded, for example when additional luggage, such as a backpack or laptop case, is stacked atop the luggage, or when front loaded as, for example when a front compartment on the luggage is laden with unwieldy or heavy items, such as a laptop computer. There is thus a need for a wheel assembly having improved stability, i.e., that has a reduced tendency to tip, under such circumstances. Moreover, there is a need for such a wheel assembly that does not unduly or inconveniently protrude from the luggage, for example where all or a portion of such a wheel assembly sticks out from the vertical profile of the luggage, which protrusion can be unsightly and can cause problems with stowing such luggage in confined spaces.

SUMMARY

In one embodiment, the disclosure is to a stabilized luggage article comprising a bottom wall, a top wall, opposed first and second major faces (e.g. opposed front and back walls, respectively, or vice versa), and opposed first and second side walls that define a cavity for storage space; a plurality of wheel assemblies mounted on the bottom wall proximate the first major face of the luggage article, each wheel assembly comprising a pivot member that extends downwardly from the bottom wall, the pivot member having a vertical axis of rotation that is projected toward but not beyond the first major face of the luggage article; and one or more wheels mounted to the pivot member, the one or more wheels rotatable around a horizontal axis and rotatable around the vertical axis, the horizontal axis spaced laterally from the vertical axis of the pivot member, wherein the pivot member extends downwardly to at least the horizontal axis. In one non-limiting practice, the pivot member is a pivot post; in another it is a kingpinless caster; in another practice, the stabilized luggage article has an expansion feature that permits increase and decrease in luggage capacity as needed.

DETAILED DESCRIPTION

The ensuing detailed description and reference to the figures is exemplary only and not restrictive of the disclosure. As used herein, the terms "stabilized" and "stabilizing" refer to luggage articles that have reduced tendency to tip over.

Figure 1:
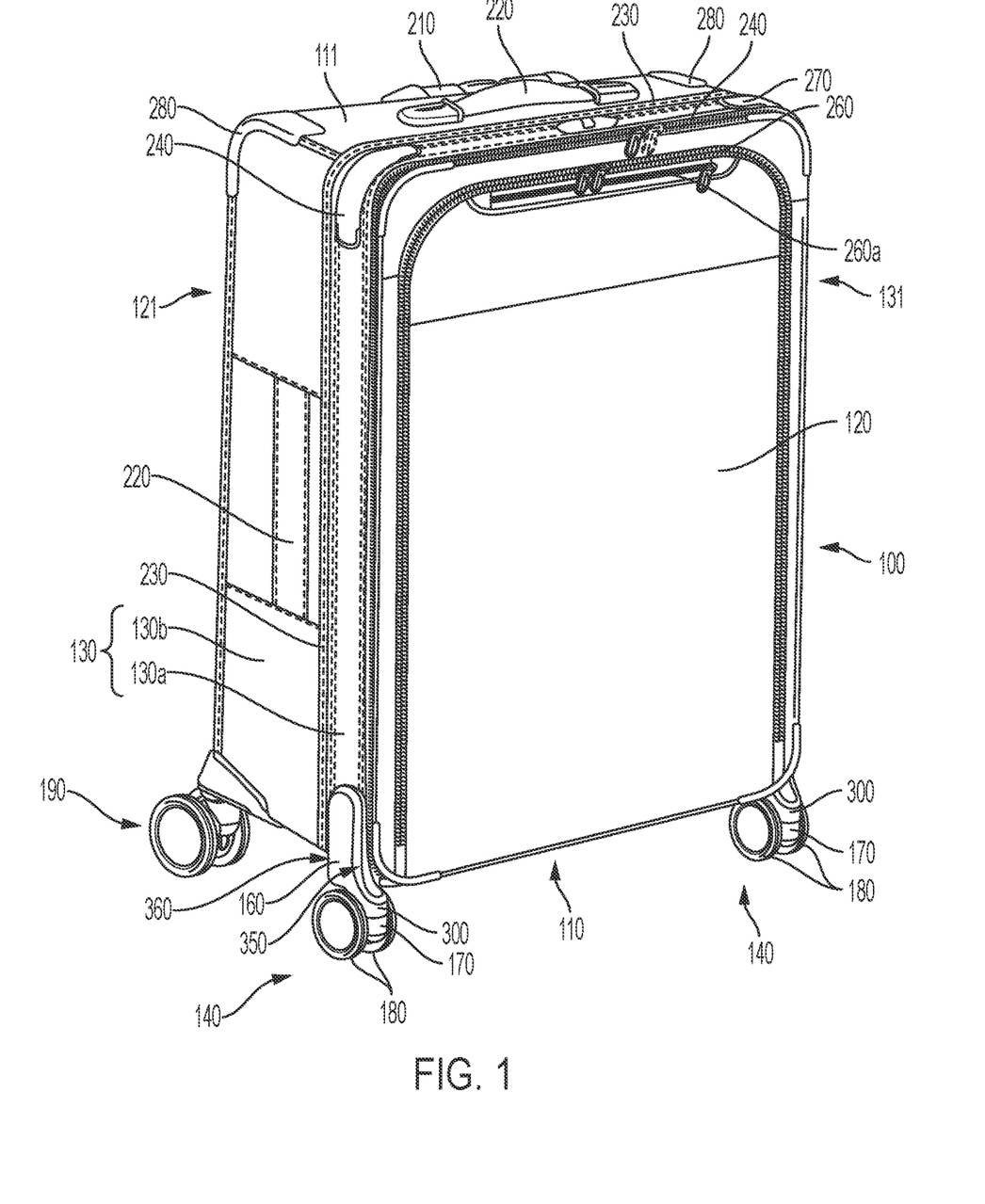
FIG. 1 is perspective view of an embodiment of a stabilized luggage article of the disclosure comprising an embodiment of the wheel assembly of the disclosure.
Figure 2:
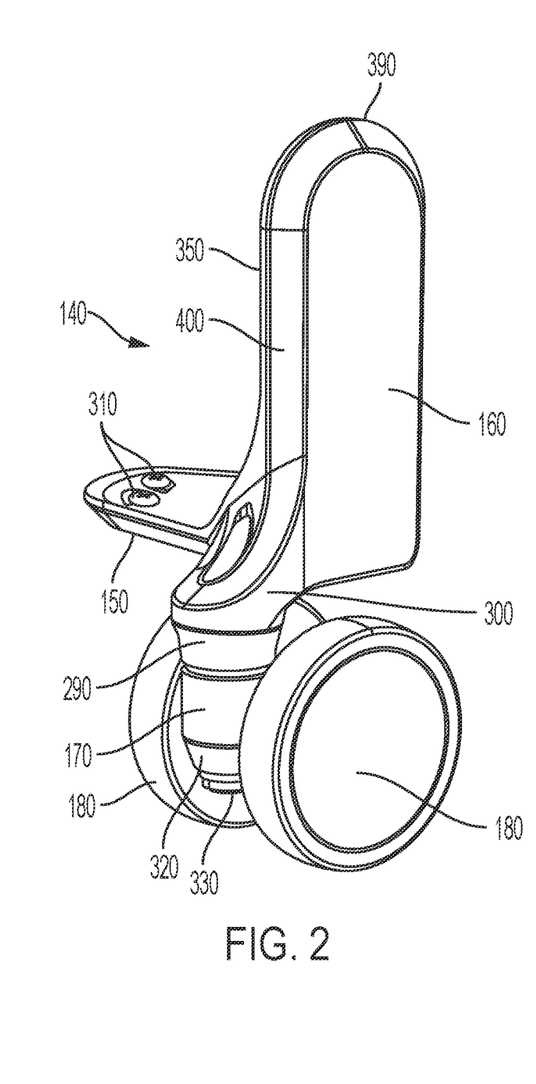
FIG. 2 is a perspective view of the stabilizing wheel assembly as depicted in FIG. 1, unattached to the luggage article.

Referring to FIG. 1, thereat is a perspective view of an exemplary stabilized luggage article 100 as contemplated by the disclosure. In one practice the luggage article is of generally parallelepiped shape, including generally rectangular (as shown in FIG. 1) and generally square shapes. As depicted, the luggage article has a bottom wall 110 (see also FIG. 4), and an opposed top wall 111, which in the practice shown are generally planar rectangular panels of substantially the same size and shape; and a first major face 120 and a second major face (generally indicated by 121) which are opposed to each other and can constitute a front wall and a back wall respectively or vice versa, and are shown in the practice depicted as generally planar rectangular panels of substantially the same size and shape; and a first side wall 130 and a second side wall (generally indicated by 131) which are opposed to each other and are shown in the practice depicted as generally planar rectangular panels of substantially the same size and shape. The top, bottom, side and major face walls define an internal cavity useful for storage space and can be made of fabric or plastic, e.g. hard shell plastic, or other material, e.g. metal.

Figure 4:
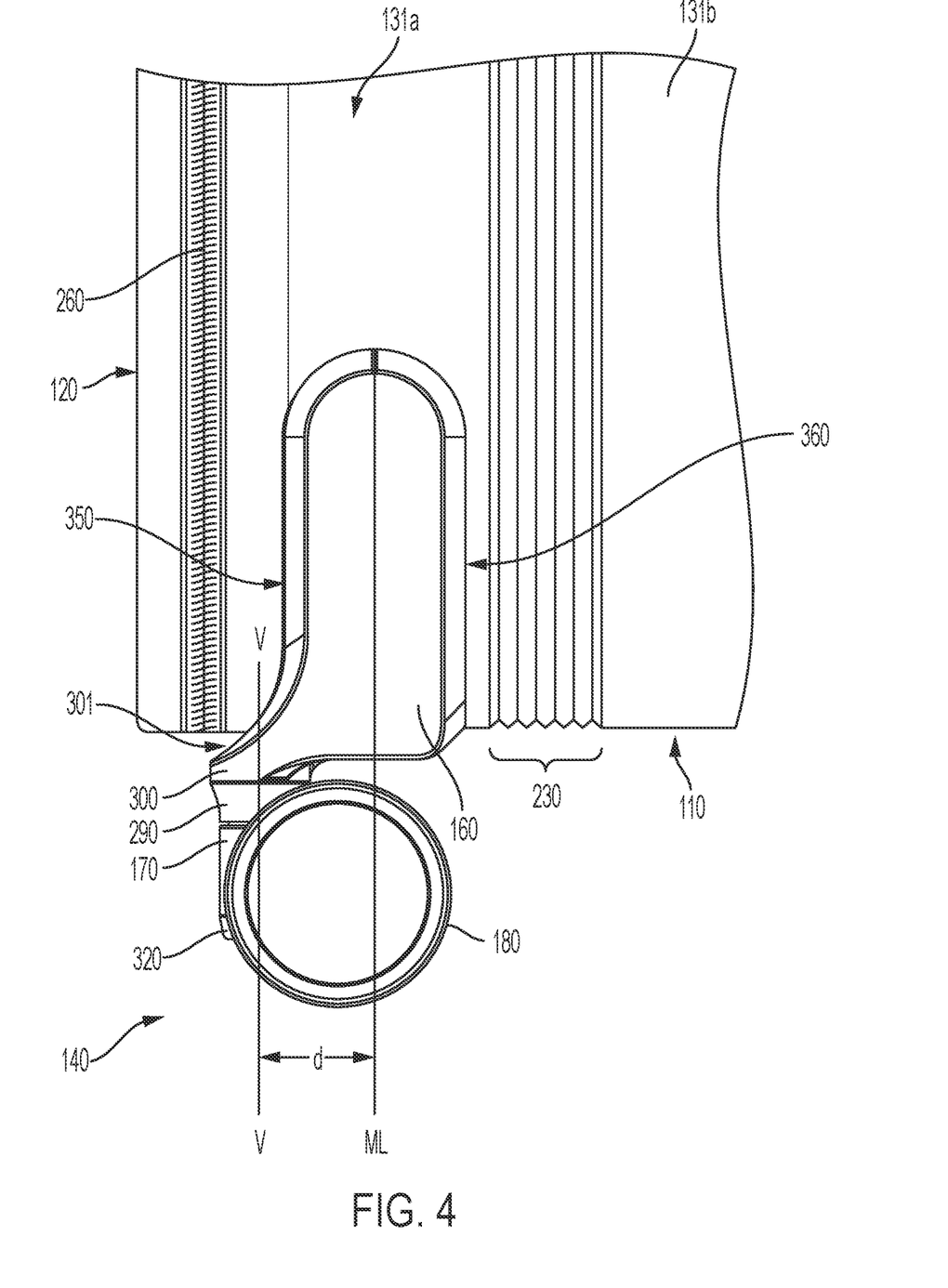
FIG. 4 is detailed partial side view of the front end of a stabilized luggage article having attached to it the stabilizing wheel assembly depicted in FIG. 2.

In the embodiment illustrated in FIG. 1, side wall 130 comprises front side wall section 130a and rear side wall section 130b and side wall 131 comprises front wall section 131a and rear side wall section 131b (see FIG. 4) which are separated by a foldable gusset 230 that extends around the entire perimeter of the luggage article 100 and permits increase and decrease in capacity of the internal storage space as needed. Foldable gusset 230 is optional and non-expandable luggage articles are contemplated by the invention. Reverting to FIG. 1, it shows foldable gusset 230 in a non-expanded state and FIG. 4 shows gusset 230 in an expanded state. In one practice, one or more expansion and locking device may be used with the gusset to secure the storage volume once obtained in order to prevent unwanted compression or expansion. Exemplary luggage articles in which the stabilizing wheel assembly of the disclosure can be employed, and exemplary expansion and locking devices which can be used are described in U.S. Pat. Nos. 7,093,700; 7,426,985; 9,486,046; 9,801,440; and 1,034,712, the entire contents of each of which are hereby incorporated by reference.

Other features illustrated in FIG. 1, which features are exemplary only, include a side handle 230, a top handle 220, an extendable handle 210 along the back wall, front edge guards 240 and rear edge guards 280. In the practice depicted, the internal storage cavity of luggage article 100 is accessed via zipper or other closure means 240. Front wall 120 comprises one or more compartments which can be accessed externally via zippers or other closure means 260 and 260a, which compartments define respective storage spaces which can, e.g. contain laptops or other such sized or weighted items and/or front wall 120 can comprise inside compartments (not shown) that are internally accessed when the luggage is open.

For purposes of convenience only, the ensuing discussion will refer to the embodiment wherein the first major face is the front wall 120 of the luggage and the second major face is the back wall 121. Reverting to FIG. 1, a plurality of wheel assemblies 140 are mounted at least on the bottom wall 110 proximate the front wall 120. In the non-limiting practice depicted in FIG. 1, a pair of conventional swivel wheels 190 are mounted on the bottom proximate the back wall 121, although rear wheels 190 may also instead comprise other conventional non-spinner wheels or may comprise stabilizing wheel assemblies 140 or may not have rear wheels at all but instead employ non-rotating supports such as legs.

As shown in FIGS. 1, 2, 3, 4, and 5, the embodiment of the wheel assembly 140 depicted comprises a base 150 which is configured for attachment, and attached, to the bottom wall by conventional attachment means, e.g. rivets, screws and the like, via holes 310, and a shoulder plate 160 which extends upwardly vertically from the base and is configured for attachment and is attached to a respective side wall, that is side wall 130 or 131 depending on which side of the luggage the wheel assembly is designed. In one example of attachment, shoulder plate 160 comprises one or more bosses 340 on the side of the shoulder plate attached to the respective side wall of the luggage e.g. the bosses have internal threads and are secured to the sidewall by means of screws. Bosses 340 may have an extended length to penetrate the respective side wall and be positioned at an upward angle, e.g. about 30° to about 60°, or about 40° to 50° or about 45° from the vertical to provide greater stability.

As depicted, shoulder plate 160 can be elongate, e.g. of substantially rectangular shape. As depicted, shoulder plate 160 has a width, denoted as "W" (see FIG. 6) defined by substantially parallel vertical sides 350 and 360, a top portion 390 which can be arched as shown or of other shape, and a vertical midline denoted as "ML" (see FIGS. 4, 6) which bisects the width W of the plate. W can be of variable width, such as without limitation, between about 50 mm and about 30 mm, e.g. about 40 mm, although these width limits may be extended or contracted. The portion of the shoulder plate near the sides can be beveled 400. Base 150 and shoulder plate 160 can be integrally formed, e.g. a unitary piece of plastic, or can be separate elements secured together.

In the non-limiting embodiment depicted, the pivot member of wheel assembly 140 comprises a pivot post 170 that extends downwardly from, and substantially perpendicularly, to bottom wall 110. The pivot post in one embodiment is substantially cylindrical; in another it is slightly tapered at or near one or both ends. Other pivot elements (not shown) are contemplated, e.g. casters such as a kingpinless caster. In the practice shown, pivot post 170 has a vertical axis of rotation noted as "V" (see FIGS. 4, 5, 6). The vertical axis, V, is projected forward toward front wall 120 but does not extend beyond the front wall, e.g. it can extend up to but does not extend beyond the vertical plane of front wall 120. In various embodiments, the distance "d" between the midline ML of the shoulder plate 160 (see FIGS. 4, 6) and the vertical axis of rotation V for the pivot post is between about 15 mm to about 35 mm; between about 17 mm to about 25 mm; including values of "d" that are preferably about 31 mm, about 28 mm, about 25 mm, and about 20 mm (see FIGS. 4 and 6). Representative values of "d" include 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, 30 mm, 31 mm, 32 mm, 33 mm, 34 mm, 35 mm. It will be understood that the ranges given throughout this specification include fractional measurements, e.g. the aforesaid range for "d" necessarily includes tenths of millimeters, such as without limitation, 15.1 mm, 15.2 mm, 15.3 mm . . . 26.9 mm, 27 mm, 27.1 mm, 27.2 mm, 27.3 mm, 27.4 mm, 27.5 mm, 27.6 mm, 27.8 mm, 27.9 mm, 28 mm, 28.1 mm, 28.2 mm, 28.3 mm, 28.4 mm, 28.5 mm, 28.6 mm, 28.7 mm, 28.8 mm, 28.9 mm, 30 mm, 30.1 mm, 30.2 mm . . . 34.5 mm, 34.6 mm, 34.7 mm, 34.8 mm, 34.9 mm, 35 mm.

In one practice, base 150 and shoulder plate form a corner portion 390 (see FIG. 5) proximate the front wall 120 and adjacent the respective side wall, here 131, from which corner portion the pivot post and its vertical axis of rotation is projected forward by stem portion 300 which protrudes from corner portion. Stem 300 can comprise an inverted arcuate upper surface as shown and comprise conical portion 290 the narrow end of which is proximate to but gapped away from pivot post 170 to permit vertical rotation. In one practice (FIG. 4), the top surface 301 of stem 300 is situated so as to provide clearance for zipper 260, e.g. either by being as close to the wheel assembly as possible and/or being sufficiently below the zipper 290, Pivot post 170 may comprise bottom conical portion 320 and be secured to the wheel assembly by e.g. rivet 330 or other conventional attachment means with a sufficient gap to permit vertical rotation, the narrow end of bottom conical portion 320 proximate the rivet 330 or other attachment means. One or more wheels 180 are mounted to the pivot post 170, e.g. orthogonally to the pivot post. The wheels 180 are rotatable around a horizontal axis (e.g. denoted "h" in FIG. 5). Wheels 180 are also rotatable around vertical axis of rotation V. In one practice, horizontal axis "h" is laterally spaced from the vertical axis V by a distance, denoted as "da" in FIG. 5, of between about 5 mm to about 30 mm; or about 10 mm to about 25 mm; or by about 17 mm. Representative values of "da" include 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, 30 mm. As herein stated, the ranges given include fractional measurements, e.g. the aforesaid range for "da" necessarily includes tenths of millimeters, such as without limitation, e.g. 5.1 mm, 5.2 mm, 5.3 mm . . . 16.1 mm, 16.2 mm, 16.3 mm, 16.4 mm, 16.5 mm, 16.6 mm, 16.7 mm, 16.8 mm, 16.9 mm, 17 mm, 17.1 mm, 17.2 mm, 17.3 mm, 17.4 mm, 17.5 mm, 17.6 mm, 17.7 mm, 17.8 mm, 17.9 mm, 18 mm, 18.1 mm . . . 29.8 mm, 29.9 mm, 30 mm. Pivot post 170 extends downwardly to at least the horizontal axis "h" but can extend beyond it.

Figure 5:
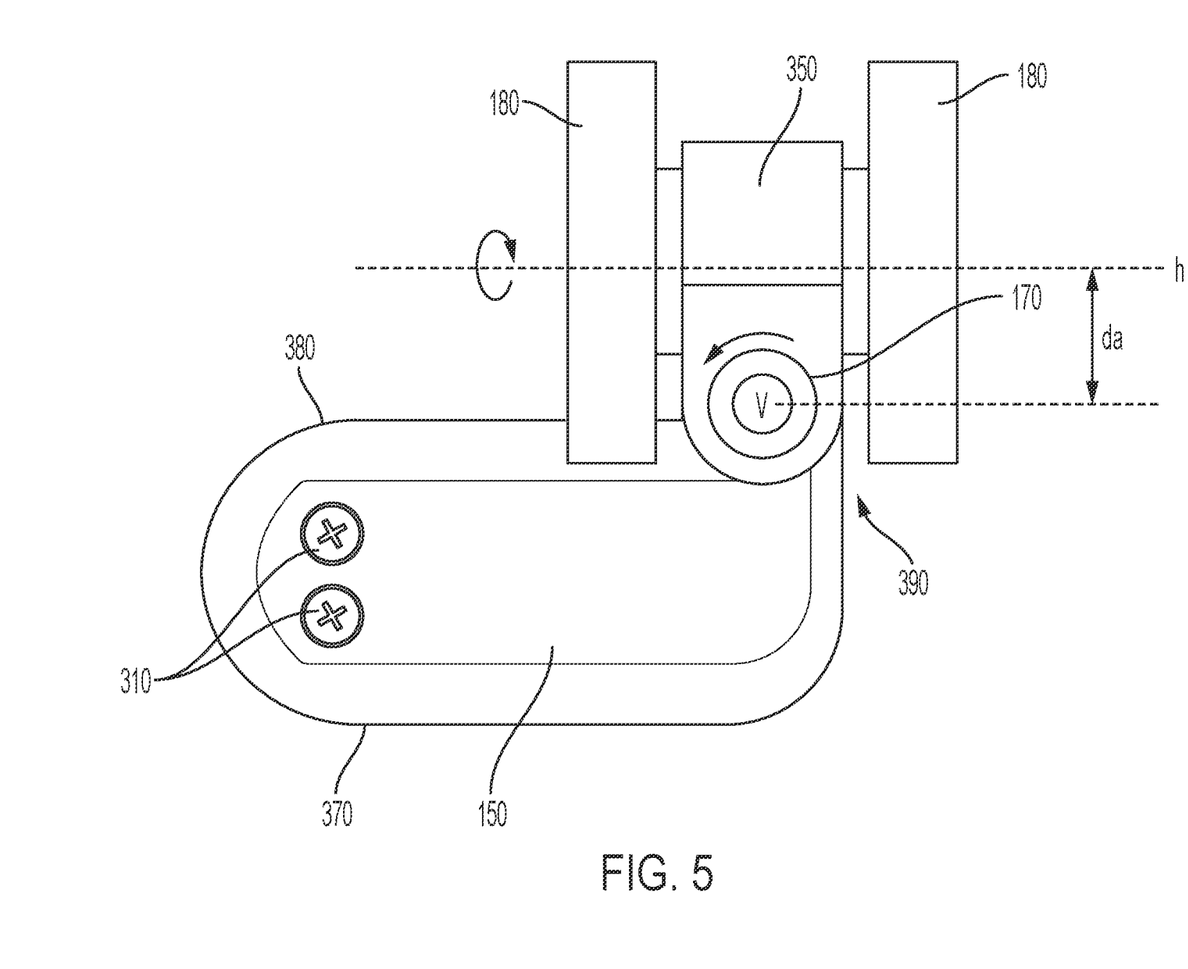
FIG. 5 is a bottom view of the stabilizing wheel assembly depicted in FIG. 2.

In the embodiment depicted in FIGS. 2, 3, 4, 5, 6 shoulder plate 160 is for the right front wheel assembly and attached to side wall 131 if luggage article 100 in FIG. 1 is viewed head on. Thus, the base 150 as shown in FIG. 5 has a front edge 380 that is proximate the front wall 120 of the luggage article and a back edge 370 that is distal to the front wall 120. As shown in FIGS. 2, 3 4, and 6, the vertical side 350 of shoulder plate 160 is the side proximate front wall 120 whereas vertical side 360 is distal from front wall 120. In one practice, the distance from the front vertical side 350 of shoulder plate 160 to the front end of the stem 300, denoted as "ds" in FIG. 6 can variously be between about 1 to about 30 mm; or between about 10 to about 20 mm; or about 16 mm. Representative values of "ds" include 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm 30 mm. As herein stated, the ranges given include fractional measurements, e.g. the aforesaid range for "ds" necessarily includes tenths of millimeters, such as without limitation e.g. 1.1 mm, 1.2 mm, 1.3 mm . . . 15.1 mm, 15.2 mm, 15.3 mm, 15.4 mm, 15.5 mm 15.6 mm, 15.7 mm, 15.8 mm, 15.9 mm, 16 mm, 16.1 mm, 16.2 mm, 16.3 mm, 16.4 mm, 16.5 mm, 16.6 mm, 16.7 mm, 16.8 mm, 16.9 mm, 17 mm, 17.1 mm . . . 29.8 mm, 29.9 mm 30 mm.

Figure 6:
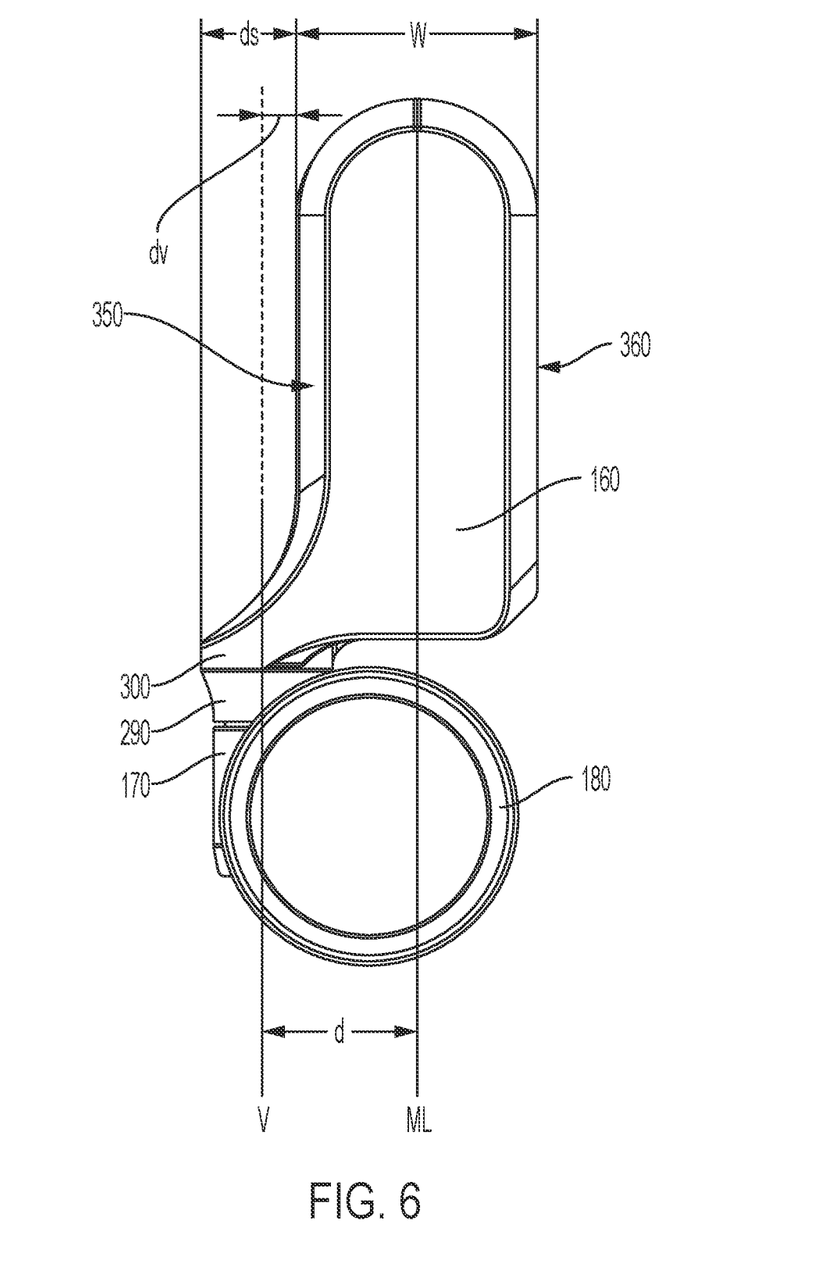
FIG. 6 is the stabilizing wheel assembly of FIG. 4 unattached to the luggage article showing various distances.
Figure 7:
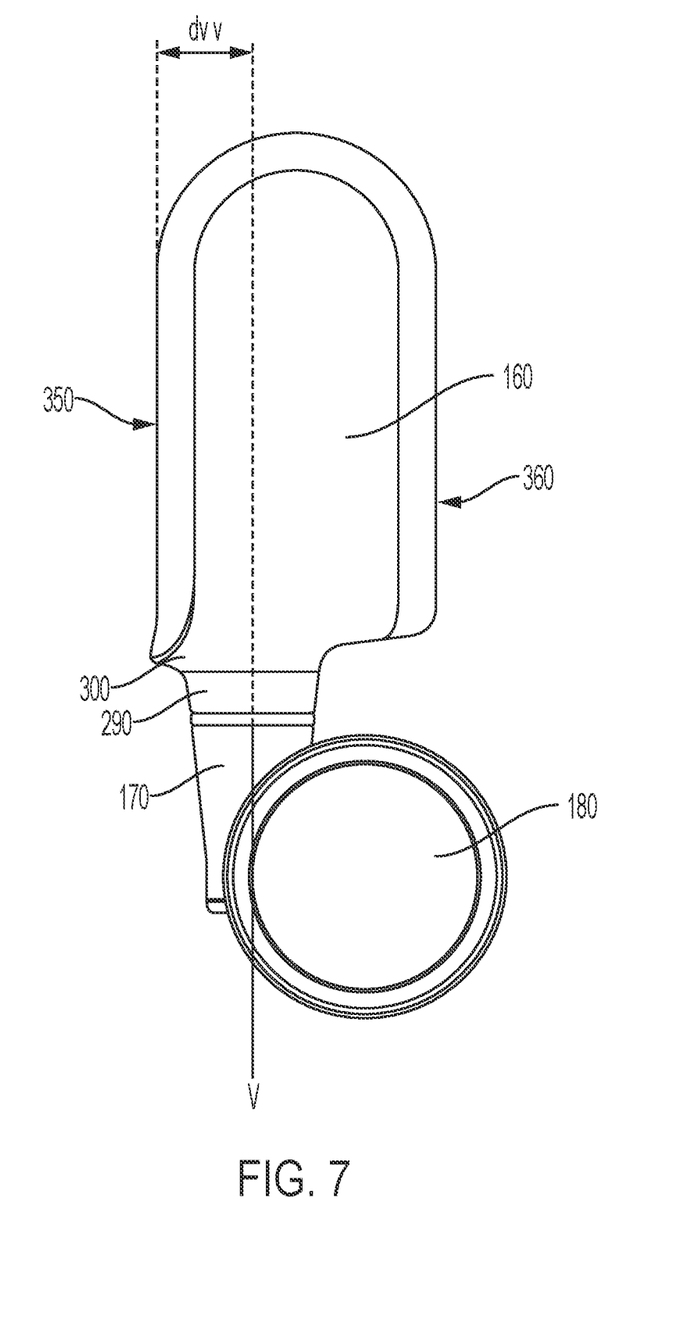
FIG. 7 is side view of another embodiment of the stabilizing wheel assembly of the disclosure.

In the practice shown in FIG. 6, the front vertical side wall 350 is aft of vertical axis V, i.e. it is toward the back wall 121. In this practice, the distance between the front vertical side 350 to the vertical axis V of pivot post 170, denoted in FIG. 6 as "dv" is between about zero mm (i.e. front vertical side wall 350 is substantially contiguous with V), preferably greater than zero mm to about 20 mm; in another practice, dv is about zero mm to about 10 mm, e.g. about 5 mm. Representative values of "dv" include 1 mm, 2 mm 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm. As herein stated, the ranges given include fractional measurements, e.g. the aforesaid range for "dv" necessarily includes tenths of millimeters, such as without limitation, e.g. 0.5 mm, 0.6 mm, 07 mm . . . 4.1 mm, 4.2 mm, 4.3 mm, 4.5 mm, 4.6 mm. 4.7 mm, 4.8 mm, 4.9 mm, 5 mm, 5.1 mm, 5.2 mm, 5.3 mm, 5.4 mm, 5.5 mm, 5.6 mm, 5.7 mm, 5.8 mm, 5.9 mm, 6 mm, 6.1 mm . . . 19.8 mm, 19.9 mm, 20 mm. In the practice shown in FIG. 7, the front vertical side wall 350 is forward of the vertical axis V, i.e. it is toward the front wall 120 and the distance between the front vertical side 350 to the vertical axis of rotation V for the pivot post is denoted "dvv" and is greater than zero up to about 15 mm, or up to about 8 mm, or up to about 5 mm. Representative values of "dvv" include 1 mm, 2 mm, 3 mm, 4 mm, 5 mm, 6 mm, 7 mm, 8 mm, 9 mm, 10 mm, 11 mm, 12 mm, 13 mm, 14 mm, 15 mm. As herein stated, the ranges given include fractional measurements, e.g. the aforesaid range for "dvv" necessarily includes tenths of millimeters, such as without limitation, e.g. 0.5 mm, 0.6 mm, 07 mm . . . 4.1 mm, 4.2 mm, 4.3 mm, 4.5 mm, 4.6 mm. 4.7 mm, 4.8 mm, 4.9 mm, 5 mm, 5.1 mm, 5.2 mm, 5.3 mm, 5.4 mm, 5.5 mm, 5.6 mm, 5.7 mm, 5.8 mm, 5.9 mm, 6 mm, 6.1 mm . . . 14.7 mm, 14.8 mm, 14.9 mm, 15 mm.

Figure 3:
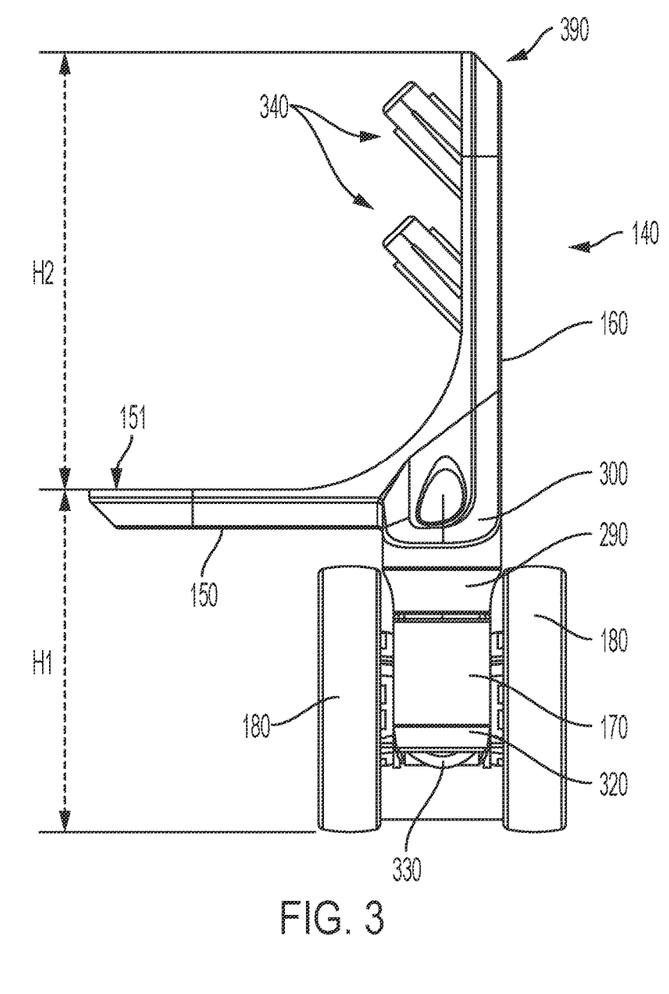
FIG. 3 is a front view of the stabilizing wheel assembly depicted in FIG. 2.

Referring to the practice shown in FIG. 3, the distance between the top (inner) surface 151 of base 150 to the bottom of wheel 180 is denoted by height "H1" and the distance between the top of shoulder plate 160 (e.g. the apex of arched top 390) to the top (inner surface) 151 of base 150 is denoted as "H2." H1 is about 45 mm to about 80 mm, or about 50 mm to about 70 mm, or about 64 mm. Representative values of H1 include 45 mm, 46 mm, 47 mm, 48 mm, 49 mm, 50 mm, 51 mm, 52 mm, 53 mm, 54 mm, 55 mm, 56 mm 57 mm, 58 mm, 59 mm, 60 mm, 61 mm, 62 mm, 63 mm, 64 mm, 65 mm, 66 mm, 67 mm, 68 mm, 69 mm, 70 mm, 71 mm, 72 mm, 73 mm, 74 mm, 75 mm, 76 mm, 77 mm, 78 mm, 79 mm, 80 mm. As herein stated, the ranges given include fractional measurements, e.g. the aforesaid range for "H1" necessarily includes tenths of millimeters, such as without limitation, e.g. 45.1 mm, 45.2 mm, 45.3 mm . . . 49.5 mm, 49.6 mm, 49.7 mm, 49.8 mm, 50 mm, 50.1 mm 50.2 mm, 50.3 mm, 50.4 mm, 50.5 mm, 50.6 mm, 50.7 mm, 50.8 mm 50.9 mm 60 mm . . . 63.1 mm, 63.2 mm, 63.4 mm, 63.5 mm, 63.6 mm, 63.7 mm, 63.8 mm, 63.9 mm, 64 mm, 64.1 mm, 64.2 mm, 64.3 mm, 64.4 mm, 64.5 mm, 64.6 mm, 64.7 mm, 64.8 mm, 64.9 mm, 70 mm . . . 79.8 mm, 79.9 mm, 80 mm.

H2 is about 50 mm to about 120 mm, or about 60 mm to about 100 mm, or about 82 mm. Representative values of H2 include 50 mm, 51 mm, 52 mm, 53 mm, 54 mm, 55 mm, 56 mm, 57 mm, 58 mm, 59 mm, 60 mm, 61 mm, 62 mm, 63 mm, 64 mm, 65 mm, 66 mm, 67 mm, 68 mm, 69 mm, 70 mm, 71 mm, 72 mm, 73 mm, 74 mm, 75 mm, 76 mm, 77 mm, 78 mm, 79 mm, 80 mm, 81 mm, 82 mm, 83 mm, 84 mm, 85 mm, 86 mm, 87 mm, 88 mm, 89 mm, 90 mm, 91 mm, 92 mm, 93 mm, 94 mm, 95 mm, 96 mm, 97 mm, 98 mm, 99 mm, 100 mm, 101 mm, 102 mm, 103 mm, 104 mm, 105 mm, 106 mm, 107 mm, 108 mm, 109 mm, 110 mm, 111 mm, 112 mm, 113 mm, 114 mm, 115 mm, 116 mm, 117 mm, 118 mm, 119 mm, 120 mm. As herein stated, the ranges given include fractional measurements, e.g. the aforesaid range for "H2" necessarily includes tenths of millimeters, such as without limitation, e.g. 50.1 mm, 50.2 mm, 50.3 mm . . . 81.5 mm, 81.2 mm, 81.3 mm, 81.5 mm, 81.6 mm, 81.7 mm, 81.8 mm, 81.9 mm, 82 mm, 82.1 mm, 82.2 mm, 82.3 mm, 82.4 mm, 82.5 mm, 82.6 mm, 82.7 mm, 82.8 mm, 82.9 mm, 83 mm, 83.1 mm, 119.8 mm, 119.9 mm, 120 mm. The ratio of H2/H1 is between about 1.0 to about 1.5; or about 1.2 to about 1.4; or about 1.3, e.g. about 1.28. In a particular embodiment, W is about 40 mm, ML is about 20 mm, distance "d" is about 25 mm, distance "ds" is about 16 mm, distance "dv" is about 5 mm, H1 is about 64 mm, and H2 is about 82 mm. In another particular embodiment, W is about 40 mm, ML is about 20 mm, distance "d" is about 28 mm, distance "ds" is about 16 mm, distance "dv" is about 5 mm, H1 is about 64 mm, and H2 is about 82 mm. As previously stated, all ranges given herein include all intermediate values whether or not expressly identified.

Figure 8:
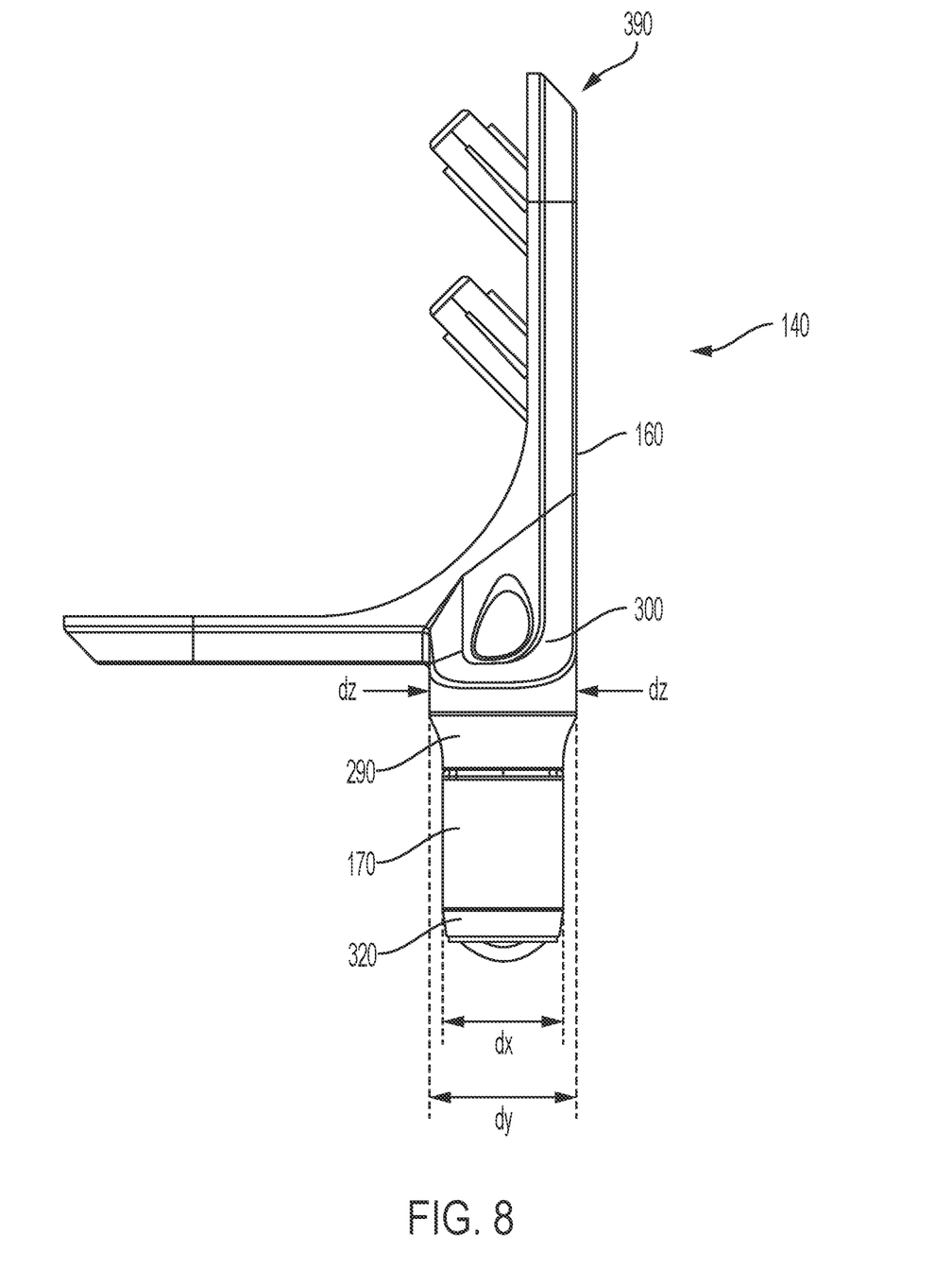
FIG. 8 is the embodiment of FIG. 3 shown with the wheels and related assembly not shown.

In another embodiment, referring to FIGS. 6 and 8, the relationship between distance ds and various diameters or widths are, individually or in any combination as follows: the distance "ds" (FIG. 6) is less than the diameter or width (if not substantially circular) "dz" (FIG. 8) of stem 300. The distance "ds" (FIG. 6) is less than the diameter (at its widest portion) "dy" (FIG. 8) of conical portion 290. The distance "ds" (FIG. 6) is less than the diameter "dy" (FIG. 8) of pivot post 170.

Referring to the embodiment in FIGS. 1 and 4, foldable gusset 230 is located between the front wheel assembly 140 and the back wall 121 of luggage article 100 but can be located elsewhere on the luggage. In this instance, shoulder plate 160 is attached to side wall portion 131a.

What is claimed is:

1. A stabilized luggage article comprising:
   a luggage article comprising a bottom wall, a top wall, opposed first and second major faces, and opposed first and second side walls that define a cavity for storage space;
   a plurality of wheel assemblies mounted on the bottom wall proximate the first major face of the luggage article, the first major face portion forming a corner portion with a respective side wall, and a stem portion protruding from the corner portion, each wheel assembly comprising a pivot member that extends downwardly from the bottom wall, the pivot member having a vertical axis of rotation that is projected toward the first major face by the stem portion but not beyond the first major face of the luggage article; and
   one or more wheels mounted to the pivot member, the one or more wheels rotatable around a horizontal axis and rotatable around the vertical axis, the horizontal axis spaced laterally from the vertical axis of the pivot member, wherein the pivot member extends downwardly to at least the horizontal axis, wherein the pivot member is a substantially cylindrical pivot post and is substantially perpendicular to the bottom wall, and the horizontal axis of wheel rotation is laterally spaced from the vertical axis of the pivot post by a distance of about 5 mm to about 30 mm.

2. The stabilized luggage article of claim 1 wherein the first major face comprises at least one compartment defining a storage space.

3. The stabilized luggage article of claim 1 wherein the one or more wheels are mounted orthogonally to the pivot member.

4. The stabilized luggage article of claim 1 wherein the pivot post extends downwardly beyond the horizontal axis of wheel rotation.

5. The stabilized luggage of claim 1 wherein the distance is about 10 mm to about 25 mm.

6. The stabilized luggage of claim 1 wherein the distance is about 17 mm.

7. A stabilized luggage article comprising:
a luggage article of generally rectangular shape comprising a bottom wall, a top wall, opposed front and back walls, and opposed side walls that define a cavity for storage space;
a pair of front wheel assemblies located on opposite ends of the bottom wall wherein each wheel assembly comprises:
a base attached to the bottom wall and a shoulder plate extending vertically from the base and attached to a respective side wall, the base and shoulder plate forming a corner portion proximate the front wall and adjacent the respective side wall from which corner portion a pivot member is projected toward but not beyond the front wall, the pivot member extending downwardly from and substantially perpendicular to the base, the pivot member having a vertical axis of rotation, and
one or more wheels mounted orthogonally to the pivot member and rotatable around a horizontal axis spaced laterally from the vertical axis of the pivot member, wherein the pivot member extends downwardly to at least the horizontal axis of wheel rotation,
wherein the pivot member is a substantially cylindrical pivot post and is substantially perpendicular to the bottom wall, and the distance between the vertical midline of the shoulder plate and the vertical axis of the pivot post is between about 15 mm to about 35 mm, and
wherein the pivot post is projected toward the front wall by a stem portion that extends outwardly from the corner portion toward the front wall.

8. The stabilized luggage article of claim 7 wherein the front wall comprises at least one compartment defining a storage space.

9. The stabilized luggage article of claim 7 wherein the pivot post extends beyond the horizontal axis.

10. The stabilized luggage article of claim 7 wherein the distance from the front edge of the vertical side of the shoulder plate to the front edge of the stem is between about 1 mm to about 30 mm.

11. The stabilized luggage article of claim 7 wherein the shoulder plate is of elongate shape and has a width defined by substantially parallel vertical sides, the shoulder plate having a vertical midline bisecting the width.

12. The stabilized luggage article of claim 7 wherein the distance is about 20 mm.

13. The stabilized luggage article of claim 10 wherein the distance is about 16 mm.

14. The stabilized luggage article of claim 7 wherein the stem comprises a substantially conical segment whose narrow end is proximate the pivot post.

15. The stabilized luggage article of claim 7 wherein the shoulder plate comprises one or more bosses on the side of the shoulder plate attached to the respective side wall, the one or more bosses extending at an upward angle and penetrating the respective side wall.

16. The stabilized luggage article of claim 7 wherein the base and shoulder plate are integrally formed.

17. The stabilized luggage article of claim 7 wherein the lateral spacing of the horizontal axis of wheel rotation and the vertical axis of the pivot post is between about 5 mm and about 30 mm.

18. The stabilized luggage article of claim 17 wherein the lateral spacing is about 17 mm.

19. The stabilized luggage article of claim 7 wherein the side walls, the top wall and the bottom wall comprise a foldable gusset that extends around the perimeter of the main body, the foldable gusset allowing expansion of the main body.

20. The stabilized luggage article of claim 19 wherein the foldable gusset is located between the front wheel assemblies and the back wall.

21. The stabilized luggage article of claim 7 further comprising a pair of non-rotating supports or a pair of rear wheels located on opposite ends of the bottom wall proximate the back wall.

22. The stabilized luggage article of claim 21 wherein the pair of rear wheels comprise spinner wheels or non-spinner wheels.

23. The stabilized luggage article of claim 7 wherein the pivot post is projected toward the front wall by a stem portion that extends outwardly from the corner portion toward the front wall, the front wall comprising at least one compartment defining a storage space and accessible by a zipper, wherein the stem portion has a top surface that is clear of the zipper.

24. The stabilized luggage article of claim 7 wherein the distance is selected from distances of about 31 mm, about 28 mm, and about 25 mm.

25. The stabilized luggage article of claim 24 wherein the distance is about 28 mm.

\* \* \* \* \*